July 31, 1956  G. A. GUTKOWSKI  2,757,362
FUEL TANK LEAK DETECTOR
Filed Nov. 15, 1954
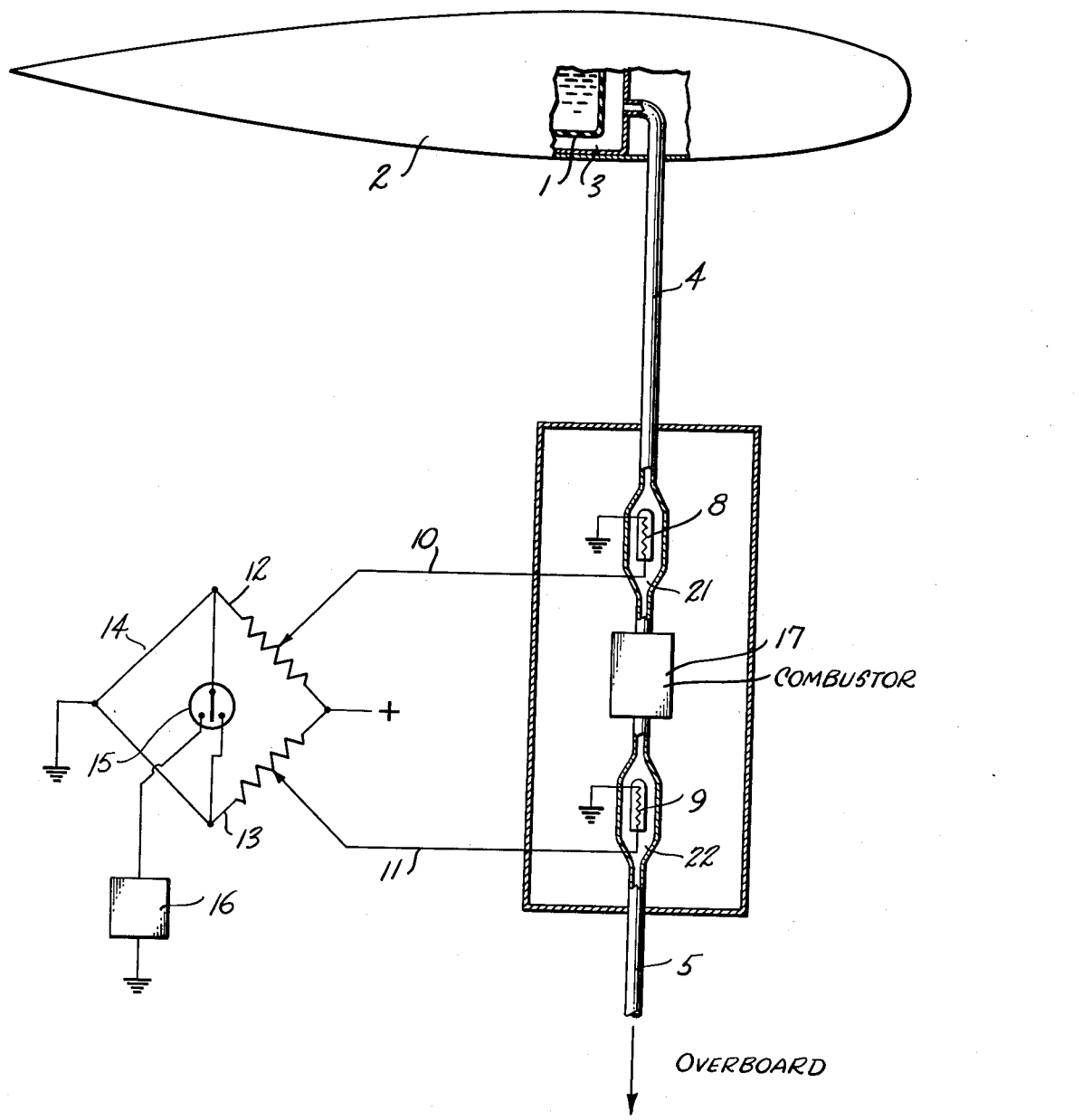
INVENTOR.
GEORGE A. GUTKOWSKI
BY
Reynolds, Beach & Christensen
ATTORNEYS

United States Patent Office 2,757,362
Patented July 31, 1956

2,757,362
FUEL TANK LEAK DETECTOR

George A. Gutkowski, Seattle, Wash., assignor to Boeing Airplane Company, Seattle, Wash., a corporation of Delaware Application November 15, 1954, Serial No. 468,730

1 Claim. (Cl. 340—237)

Fuel tanks in aircraft are as a rule enclosed within or constitute a compartment within the structural parts of the aircraft, for instance, within the wing or within the fuselage. When highly volatile and combustible fuel leaks from such a tank into the space between it and the enclosing structure, or into adjacent enclosed space, a grave danger of fire or explosion results. It is urgently necessary that the pilot be informed of the existence of such a hazard at the earliest possible moment, in order that he may take immediate steps to combat the danger, or to minimize its effects, or to initiate optional or automatic safety measures.

While there are devices to collect sufficient of the liquid to become visually apparent to the pilot, such devices, dependent upon collection of some appreciable quantity of leaked liquid, are far too slow in operation, for the danger is imminent with the presence of only small quantities of vaporous fuel.

The present invention has for its object the provision of simple means to sense, to indicate, or to combat such a hazard immediately upon its occurrence, means which will ordinarily require a minimum current flow, and which is readily kept in a balanced condition, but which is positively unbalanced automatically by the leakage of even a minimum amount of fuel, whether in the liquid or the vapor phase, into such an enclosed space to indicate immediately the presence of such leaked fuel, or alternatively, to take automatic steps to combat the danger as a result of the detection of its presence.

More particularly, it is an object of the present invention to utilize the leaked fuel to effect safely the generation of heat, by such heat to affect a single thermally sensitive element only, and to cause that thermally sensitive element to affect an electrical circuit, to initiate operation of indicating, warning, or corrective means.

Primarily the invention contemplates the use of a vent duct leading from the space between the tank and its enclosing structure, within which space vaporous leaked fuel will first collect, to a point of discharge, as overboard. Within this vent duct, intermediate its ends, are connected two chambers, arranged in tandem. The two chambers contain each an electric conductive element of a material which is variable in a current-flow characteristic with change of temperature. A small current flowing continuously through such an element will affect an indicator in a given manner, but if the current flow through the element is changed by change in its temperature, the altered current flow can be made to indicate the fact that a temperature change has occurred, or to initiate automatically a warning signal or remedial action. Temperature change in one only of two chambers, can be made to occur by providing means within the duct, in advance of that second chamber but beyond the first such chamber, automatically operable to oxydize the leaked fuel vapor just before it enters such second chamber, and so to increase the temperature of the corresponding element. Such oxydizing means may be a catalytic or other combustor, either slowly acting or acting with explosive rapidity. Since temperature changes over a wide range, from extraneous causes, are to be expected in aircraft operation, it is preferred that two chambers and two temperature-sensing elements be employed, the one balanced against the other, so that extraneous temperature changes, affecting the two alike, will produce no effect, but unbalance resulting from oxidation of fuel in advance of one chamber but beyond the other will promptly be sensed by circuit means, such as a balanced bridge circuit to which the two elements would be connected, and the required indication, warning, or remedial action will be initiated at once. Because of the manifest advantages of the balanced two-element arrangement, that only will be described hereinafter.

The drawing illustrates a preferred tandem arrangement of a two-chamber detector, incorporating the principles of this invention.

It may be assumed that a fuel tank 1 is enclosed within an airplane wing structure 2 and supplies fuel by a supply line, not shown, to an engine, which likewise is not shown. In the event of leakage from the tank, the vaporous fuel, and possibly liquid as well, will tend to collect within the space 3 within the wing structure or other enclosure 2. A spark from static electricity or from the operation of electrical devices may cause it to explode or to catch fire, and it is this danger which must be guarded against.

According to this invention a vent duct 4 leads from the space 3 to an open vent or to a vent connection at 5, whereby the leaked fuel may be discharged overboard. Intermediate its ends the vent duct includes two chambers 21 and 22, which are located in tandem.

Referring specifically first to the form of the figure, in each of the chambers 21 and 22 is located a like, preferably identical, electrical element 8 and 9, a current flow or current conducting characteristic of which (its resistance, for example) varies with change of temperature. It is immaterial whether the elements' temperature coefficient be a positive one or a negative one. Normally it would be a positive one. The respective elements 8 and 9 are connected by the leads 10 and 11, respectively, to balanced arms 12 and 13 of a balanced bridge circuit generally indicated by the numeral 14.

If the bridge circuit 14 is initially and normally balanced, and if the current flow through the respective elements 8 and 9 is normally identical, it is evident that the bridge will remain in balance, and the current flow through the circuit as a whole will be slight, but if the current flow characteristic of one of the elements 8 or 9 (its resistance, in the suggested form) is thermally or otherwise altered with relation to the like characteristic of the other, the bridge will become unbalanced. This unbalance can be detected by the detector at 15, and can be made evident, or corrective measures may be taken automatically, by a suitable element at 16.

Variation in the current flow characteristic of the element 9 in the second chamber 22 is accomplished, according to the present invention, by heating it. To this end, the fuel flow through the duct 4 is led first through the chamber 21 and past the element 8, and then through a combustor 17, for instance, a catalytic combustor, which is connected in the duct intermediate the chambers 21 and 22. The heat therein generated in the combustor 17 by oxidation, whether gentle or explosive, affects the element 9 and changes its characteristic with relation to the unaffected first element 8. The heat thus generated is led off by way of the remaining portion of the duct 4 into the vent connection at 5, and so overboard, causing no particular harm.

It is clear that the device will function as indicated whether the leaked fuel in the space 3 is gaseous only, or gaseous and liquid. The vent duct 4 may lead from the low point of this space, if liquid fuel is primarily to be detected, but since it is the vaporous fuel, which is the first evidence of leakage, that is extremely dangerous, it may be preferable to lead off the vent duct 4 from a higher point in the space 3, such as would be more likely to be occupied by the gaseous leakage.

It will be noted that the combustor 17 is located intermediate the first and second chambers 21 and 22, respectively, which are in tandem. There being nothing to oxydize the leaked fuel prior to its passing the element 8, the temperature of the latter is unaffected. The fuel is oxydized by the combustor 17 after passing the element 8 and prior to its reaching the element 9, so that the temperature of the latter, only, is raised.

Flame guards and like devices would be used, as needed and in accordance with normal practice, but have not been illustrated.

I claim as my invention:

A leak detector for fuel tanks or the like, such as are installed within an enclosing structure, comprising a vent duct open at one end and arranged for connection at its other end to the space between the tank and the enclosing structure, a first and a second chamber included within said vent duct, as part thereof, located at spaced points in the duct's length, like electrically conductive elements in each such chamber, and each subject to the temperature in its chamber, and formed of a material which is variable in a current-flow-characteristic with change of temperature, an electrical sensing device to which said temperature-sensitive elements are oppositely and equally connected, and which is thereby maintained in a state of equilibrium so long as the temperatures affecting the respective elements remain alike, but which is unbalanced by a difference in such temperatures, and a means connected in said conduit, beyond the first chamber and in advance of the second chamber, automatically operable to oxydize leaked fuel passing through said second chamber, and by such oxidation to create a temperature rise affecting the temperature-sensing element in said second chamber, only.

References Cited in the file of this patent

UNITED STATES PATENTS

| | | |
|---|---|---|
| 1,770,059 | Barber | July 8, 1930 |
| 2,231,166 | Knoedler | Feb. 11, 1941 |
| 2,400,923 | Farr et al. | May 28, 1946 |
| 2,583,930 | Cotton | Jan. 29, 1952 |